United States Patent
Li

(10) Patent No.: US 10,387,169 B2
(45) Date of Patent: Aug. 20, 2019

(54) PLUG-IN PACKAGING METHOD, DEVICE, TERMINAL AND STORAGE MEDIA

(71) Applicant: PING AN TECHNOLOGY (SHENZHEN) CO., LTD., Shenzhen, Guangdong (CN)

(72) Inventor: Ying Li, Shenzhen (CN)

(73) Assignee: PING AN TECHNOLOGY (SHENZHEN) CO., LTD., Shenzhen (CN)

(*) Notice: Subject to any disclaimer, the term of this patent is extended or adjusted under 35 U.S.C. 154(b) by 0 days.

(21) Appl. No.: 15/577,717

(22) PCT Filed: Feb. 22, 2017

(86) PCT No.: PCT/CN2017/074373
§ 371 (c)(1),
(2) Date: Nov. 28, 2017

(87) PCT Pub. No.: WO2018/086268
PCT Pub. Date: May 17, 2018

(65) Prior Publication Data
US 2018/0293085 A1    Oct. 11, 2018

(51) Int. Cl.
G06F 9/445 (2018.01)
G06F 8/41 (2018.01)
G06F 9/455 (2018.01)

(52) U.S. Cl.
CPC ............ *G06F 9/44526* (2013.01); *G06F 8/41* (2013.01); *G06F 8/44* (2013.01); *G06F 9/45504* (2013.01)

(58) Field of Classification Search
CPC .............................. G06F 9/44526; G06F 8/41
(Continued)

(56) References Cited

U.S. PATENT DOCUMENTS

| 8,839,234 B1 | 9/2014 | Voronkov et al. |
| 2007/0083527 A1 | 4/2007 | Wadler et al. |

(Continued)

FOREIGN PATENT DOCUMENTS

| CN | 1853165 A | 10/2006 |
| CN | 101667135 A | 3/2010 |

(Continued)

OTHER PUBLICATIONS

First Office Action for counterpart Australian Patent Application No. 2017258904, dated Nov. 21, 2018.
(Continued)

*Primary Examiner* — John Q Chavis
(74) *Attorney, Agent, or Firm* — Loza & Loza, LLP; Michael F. Fedrick

(57) ABSTRACT

A plug-in packaging method, device, terminal and storage media. The method includes: obtaining an executable file created by compiling a source code of a host project; obtaining a base library of the host project that includes at least one compiled public base method; compiling plug-ins required to be packaged respectively by multi-thread based on the base library of the host project; storing the compiled plug-ins required to be packaged into resources of the host project; and packaging the executable file and the resource of the host project together into an apk packet. The above method could improve the packaging speed of the entire apk.

19 Claims, 2 Drawing Sheets

(58) Field of Classification Search
USPC .......................................................... 717/140
See application file for complete search history.

(56) References Cited

U.S. PATENT DOCUMENTS

| | | | |
|---|---|---|---|
| 2014/0057620 A1* | 2/2014 | Lin | ........................ G06F 8/654 |
| | | | 455/418 |
| 2014/0298318 A1 | 10/2014 | Ahn et al. | |
| 2015/0012924 A1* | 1/2015 | Liu | .................... G06F 9/44526 |
| | | | 719/318 |
| 2015/0150025 A1 | 5/2015 | Yuen et al. | |

FOREIGN PATENT DOCUMENTS

| CN | 101909082 A | 12/2010 |
|---|---|---|
| CN | 101909082 A | 12/2012 |
| CN | 104461466 A | 3/2015 |
| CN | 104834515 A | 8/2015 |
| CN | 104932928 A | 9/2015 |
| CN | 105988852 A | 10/2016 |

OTHER PUBLICATIONS

First Office Action and translation for counterpart Chinese Patent Application No. 201611005684.X, dated Nov. 19, 2018.
Zhu, Xiaojia, "Research on Dynamic Loading Technology of Android Modules for OS," China's Outstanding Master's Thesis Information Technology Series, Chinese Academic Journal (CD-ROM) E-Magazine, Jan. 15, 2015 (dissertation dated May 22, 2014).
Zhang, Hongming, "Multithreading," .NET Framework Programming, Tsinghua University Press, 2016, chapter 5, pp. 181-184.

* cited by examiner

PLUG-IN PACKAGING METHOD, DEVICE, TERMINAL AND STORAGE MEDIA

CROSS-REFERENCE TO RELATED APPLICATIONS

This application is the U.S. national stage of International Patent Application No. PCT/CN2017/074373, filed on Feb. 22, 2017 and entitled PLUG-IN PACKAGING METHOD, DEVICE, TERMINAL AND STORAGE MEDIA, which claims the benefit of priority under 35 U.S.C. § 119 from Chinese Patent Application No. 201611005684.X, filed Nov. 14, 2016. The disclosures of the foregoing applications are incorporated herein by reference in their entirety.

TECHNICAL FIELD

Embodiments of the present application relate to the field of software, and more particularly to a plug-in packaging method, device, terminal, and storage medium.

BACKGROUND

A large code item will become very complicated and repetitive if it needs to be recompiled, packaged, tested every time, as a process script engine, ant is used for calling program automatically to complete the compilation, packaging, testing of the project and so on.

At present, in the Android system, as a mainstream packaging tool of Android applications, Ant does not support well for multi-plug-in applications, each of the plug-ins always needs to be compiled manually and needs to integrate a main project of the multi-plug-in, which resulting in the entire ant package is slow and inefficient.

SUMMARY

An embodiment of the present application provides a plug-in packaging method, device, terminal and storage medium, and is intended to solve the problem that the packaging speed is too slow when the ant system is used for packaging in the Android system.

A first aspect of an embodiment of the present application provides a plug-in packaging method, wherein the method includes:

obtaining an executable file created by compiling a source code of a host project;

obtaining a base library of the host project that includes at least one compiled public base method;

compiling plug-ins required to be packaged respectively by multi-thread based on the base library of the host project;

storing the compiled plug-ins required to be packaged into the resources of the host project; and packaging the executable file and the resource of the host project into an apk packet together.

A second aspect of an embodiment of the present application provides a plug-in packaging device, wherein the device includes:

an executable file obtaining unit configured for obtaining an executable file created by compiling a source code of a host project;

a base library of the host project acquisition unit configured for obtaining a base library of the host project that includes at least one compiled public base method;

a plug-in compiling unit configured for compiling plug-ins required to be packaged respectively by multi-thread based on the base library of the host project;

an compiled plug-in storage unit configured for storing the compiled plug-ins required to be packaged into resources of the host project; and an apk packet generation unit configured for packaging the executable file and the resource of the host project into an apk packet together.

A third aspect of an embodiment of the present application provides a terminal, wherein, the terminal includes a processor and a memory;

the memory is configured to store a plug-in packaging system comprising at least one program instruction which can be executed by a processor;

the processor is configured for executing program instructions of the plug-in packaging system and thereby performing following steps:

obtaining an executable file created by compiling a source code of a host project;

obtaining a base library of the host project that includes at least one compiled public base method;

compiling plug-ins required to be packaged respectively by multi-thread based on the base library of the host project;

storing the compiled plug-ins required to be packaged into resources of the host project; and packaging the executable file and the resource of the host project into an apk packet together.

A fourth aspect of an embodiment of the present application provides a non-transient computer readable storage medium storing instructions executable by one or more processors to perform operations, wherein the operations includes:

obtaining an executable file created by compiling a source code of a host project;

obtaining a base library of the host project that includes at least one compiled public base method;

compiling plug-ins required to be packaged respectively by multi-thread based on the base library of the host project;

storing the compiled plug-ins required to be packaged into resources of the host project; and packaging the executable file and the resource of the host project into an apk packet together.

In the embodiments of the present application, since the plug-ins required to be packaged are respectively compiled by multi-thread, it is possible to improve the compilation speed of each plug-in, thereby improving the packaging speed of the entire apk.

DETAILED DESCRIPTION OF THE EMBODIMENTS

In order to make the objects, technical solutions and advantages of the present invention more clearly, the present application will be described in further detail with reference to the accompanying drawings and embodiments. It should be understood that the specific embodiments described herein are merely illustrative of the application and are not intended to limit the application.

In the embodiments of the present application, an executable file created by compiling a source code of a host project is obtained, a base library of the host project is obtained that includes at least one compiled public base method; compiles plug-ins required to be packaged respectively by multi-thread based on the base library of the host project; the compiled plug-ins required to be packaged into resource of the host project is stored; the executable file and the resource of the host project into an apk packet together is packaged.

In order to explain the technical solution described in the present application, the following description will be made through specific embodiments.

Embodiment 1

Figure 1:
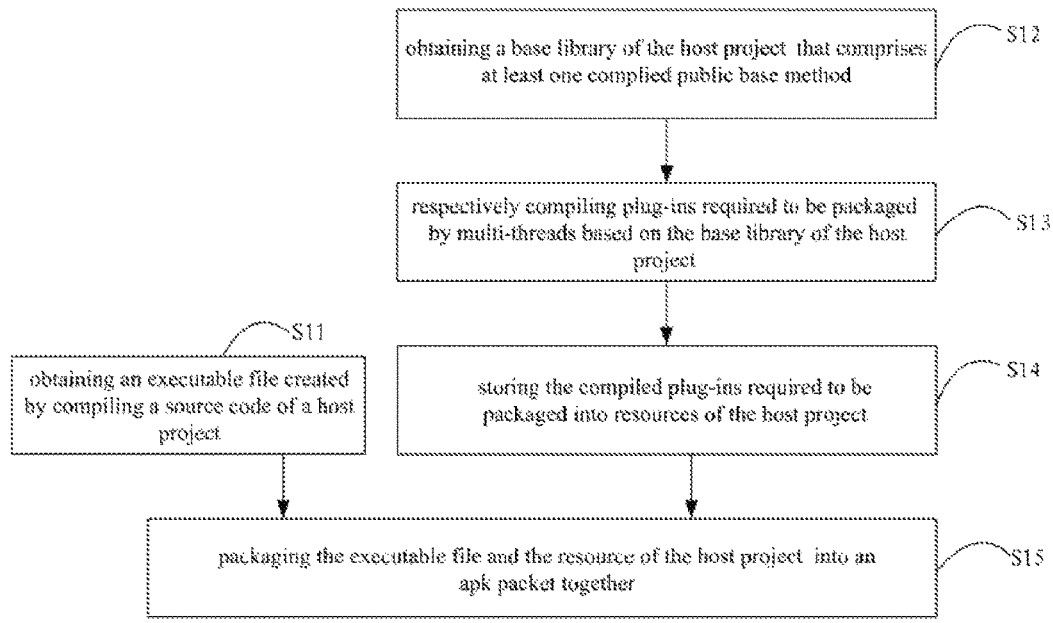
FIG. 1 is a flow chart of a plug-in packaging method provided by a first embodiment of the present application.

FIG. 1 shows a flow chart of a plug-in packaging method provided by a first embodiment of the present application, detailed as follows:

in a step S11, obtaining an executable file created by compiling a source code of a host project.

Wherein, the executable file can be multiple, such as an executable file in a dex type, one or more dex files can form a dex packet.

Determining the host project corresponded to the source code to be compiled (for example, the host project is determined by the unique identification and/or version number), and then compiles the source code (the source code could be java code) of the host project, obtains compile the corresponding executable file after compiling the source code of the host project.

It is to be noted that there's no fixed sequence between the step S11 and the subsequent steps S12 to S14, which means that the step S11 is not necessarily performed before the step S12 to step S14.

In a step S12, obtaining a base library of the host project that includes at least one compiled public base method.

The base library of the host project includes at least one complied public basic method, the public basic method includes public base methods needed to compile the plug-in, and also includes public basic methods needed to compile the host project.

Wherein, the step S12 includes:

A1, obtaining environmental information, version information and compilation tools. The version information includes a version number of the host project. Wherein, the environmental information includes test environment, gray-scale environment, produce environment and so on, different environments correspond to different servers, since the data stored in different servers are usually different, different data can be obtained from different servers; wherein the version information refers to the host project version number and other information.

A2, obtaining at least one public basic method based on the environmental information and version information. Since the public basic method of the base library of the host project is needed in the subsequent compilation of the plug-in, in order to compile the plug-in accurately and quickly, at least one public basic method is needed.

A3, compiling the public basic method according to the compilation tools, to obtain the base library of the host project.

Alternatively, since one or more methods required for subsequent compilation of all plug-ins could not be included in the public basic method acquired through an environment, in order to compile all the plug-ins, after A2, the step S12 further includes:

determining whether the acquired public basic method includes the designated public basic method or not, if not, then prompting to replace the environment information and version information to obtain specified public basic methods through the replaced environment information and version information. Wherein, the designated public basic methods are the methods needed to compile all the plug-ins, the number of specified public basic methods is related to the number of subsequent plug-ins to be compiled (that is the plug-ins to be packaged), which could be one or more. Since the servers corresponding to different environment information and different version information are different, and the data stored in different servers is usually different, therefore, when the public basic method acquired through an environmental information and version information does not include the specified public basic method, it is necessary to replace the other environmental information and version information, and determines whether the acquired public basic method includes the designated public basic method in the server corresponding to the replaced environmental information and version information.

In a step S13, compiling plug-ins required to be packaged respectively by multi-thread based on the base library of the host project.

In this step, the plug-ins are compiled separately according to the public basic method in the base library of the host project. When there are plurality plug-ins to be packaged, at least two threads are used to compile the plug-ins to be packaged separately. It should be noted that the number of threads used for compilation is less than or equal to the number of the plug-ins to be packaged. When the number of threads used for compilation is equal to the number of the plug-ins to be packaged, one thread compiles one plug-in to be packaged; when the number of threads used for compilation is less than the number of the plug-ins to be packaged, presets the priorities for the plug-ins to be packaged, then the plug-in with a higher priority is compiled in advance based on the priorities of the plug-ins to be packaged.

Therein, the step S13 includes:

B1, determining whether the plug-in to be packaged is the latest version or not. A plug-in information table is pre-configured, which includes a unique identifier of the plug-in, when the plug-in information (such as the plug-in version number or the plug-in description information) is updated, the plug-in information table is updated synchronously. When determining the plug-in to be packaged, the unique identifier of the plug-in to be packaged is compared to the unique identifier of the plug-in in the plug-in information table, and after the plug-in is matched with a same identification of the plug-in, determines whether the plug-in information for the unique identifier of the same plug-in is updated or not, if not updated, then determines the plug-in corresponding to the same plug-in unique identification of the same plug-in is the plug-in with the latest version, otherwise, determines that the plug-in corresponding to the same plug-in unique identification of the same plug-in is not the plug-in with the latest version.

B2, when the plug-in to be packaged is the plug-in with a latest version, compiling plug-ins required to be packaged by multi-thread based on the base library of the host project.

It should be noted that when a plug-in to be packaged is not the plug-in with a latest version, reminders the user to select the plug-in with a latest version, and then compiles selected plug-in with a latest version by multi-thread.

In a step S14, storing the compiled plug-ins required to be packaged into resources of the host project.

Wherein, the host project here can be understood as a main project, a main application, in the resources of the host project, resources like pictures, strings and so on could be included as well.

Storing the compiled plug-ins required to be packaged into the directory specified by the host project.

Alternatively, in order to make is convenient for user to view, the compiled plug-in to be packaged is compressed and then stored in a directory specified by the host project.

In a step S15, packaging the executable file and the resource of the host project into an apk packet together.

Wherein, the apk package is an Android installation package.

It should be noted that, the resource of the host project not only includes the complied plug-in to be packaged, but also includes other resources of the host project, such as the pictures, strings of the host project and so on.

Alternatively, in order to improve the security of the apk packet, after the step S15, the method further includes:

Signing the apk packet to obtain a signed apk packet.

Before the apk packet is signed, the content of the apk packet can be confused, and the confused apk packet can be signed to further improve the security of the apk packet.

In the first embodiment of the present application, obtaining an executable file created by compiling a source code of a host project; obtains a base library of the host project that includes at least one compiled public base method; compiles plug-ins required to be packaged by multi-thread based on the base library of the host project; stores the compiled plug-ins required to be packaged into resources of the host project; packages the executable file and the resource of the host project into an apk packet together. Since the plug-ins required to be packaged is compiled by multi-thread, it is possible to improve the compilation speed of each plug-in, thereby increasing the packaging speed of the entire apk.

It should be understood that in the embodiments of the present application, the sizes of the sequence number of the above procedures do not represent the execution order, the execution order of each process should be determined by its function and intrinsic logic, which should not be construed as limiting the implementation of embodiments of the present application.

Embodiment 2

Figure 2:
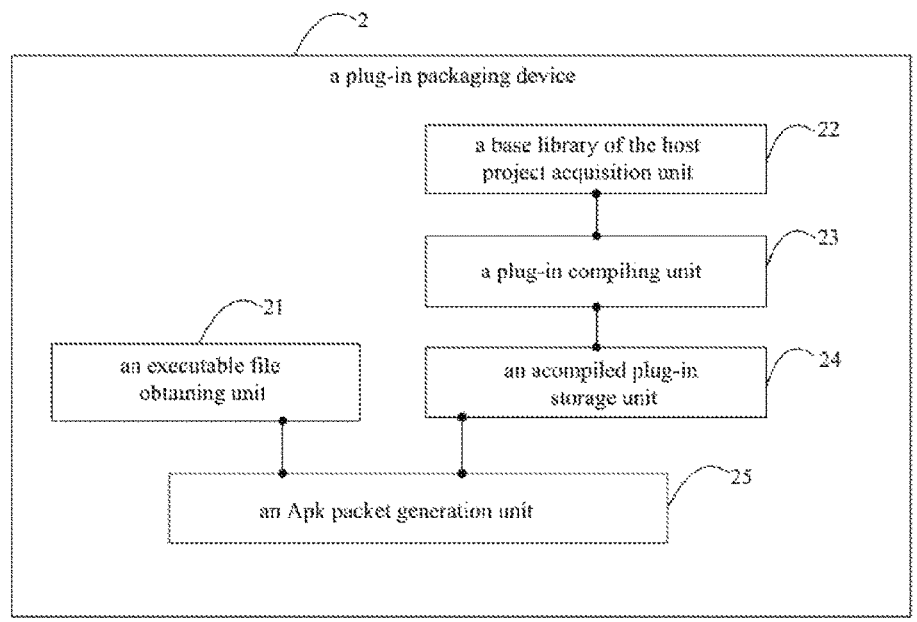
FIG. 2 is a structural diagram of a plug-in packaging device provided by a second embodiment of the present application.

FIG. 2 is a structural diagram of a plug-in packaging device provided by a second embodiment of the present application, the plug-in packaging device can be used in various mobile terminals, the mobile terminal could include a user device that communicates with one or more core networks via a wireless access network RAN, the user device could be a mobile phone (or named as a "cellular" phone), a computer having a mobile device, for example, the user device could also be a portable, pocket, handheld, computer built-in or in-vehicle mobile device that exchanges voice and/or data with a wireless access network. As another example, the mobile device could include a smartphone, a tablet, a home theater, a personal digital assistant PDA, a sales terminal POS, or a car computer. For convenience of explanation, only portions related to the embodiments of the present application are shown.

The plug-in packaging device 2 includes an executable file obtaining unit 21, a base library of the host project acquisition unit 22, a plug-in compiling unit 23, an compiled plug-in storage unit 24, and an Apk packet generation unit 25, wherein:

The executable file obtaining unit is configured for obtaining an executable file created by compiling a source code of a host project.

Wherein, the executable file can be multiple, such as an executable file in a dex type, one or more dex files can form a dex packet.

The base library of the host project acquisition unit 22 is configured for obtaining a base library of the host project that includes at least one compiled public base method.

The base library of the host project includes at least one complied public basic method, the public basic method includes public base methods needed to compile the plug-in, and also includes public basic methods required to compile the host project.

The base library of the host project acquisition unit 22 includes:

an environmental information obtaining module configured to obtain environmental information, version information and compilation tools. The version information includes a version number of the host project. Wherein, the environmental information includes test environment, grayscale environment, produce environment and so on, different environments correspond to different servers, since the data stored in different servers are usually different, different data can be obtained from different servers; wherein the version information refers to the host project version number and other information.

A public basic method obtaining module configured to obtain at least one public basic method based on the environmental information and version information.

A base library of the host project generating module configured to obtain the base library of the host project based on the public basic method compiled by the compilation tools.

Alternatively, since one or more methods required for subsequent compilation of all plug-ins could not be included in the public basic method acquired through an environment, in order to compile all the plug-ins, the plug-in packaging device further includes:

a public basic method matching unit configured for determining whether the acquired public basic method includes the designated public basic method or not, if not, then prompting to replace the environment information and version information to obtain specified public basic methods through the replaced environment information and version information.

Wherein, the designated public basic methods are the methods needed to compile all the plug-ins, the number of specified public basic methods is related to the number of subsequent plug-ins to be compiled (that is the plug-ins to be packaged), which could be one or more. Since the servers corresponding to different environment information and different version information are different, and the data stored in different servers is usually different, therefore, when the public basic method acquired through an environmental information and version information does not include the specified public basic method, it is necessary to replace the other environmental information and version information, and determines whether the acquired public basic method includes the designated public basic method in the server corresponding to the replaced environmental information and version information.

The plug-in compiling unit 23 is configured for compiling plug-ins required to be packaged respectively by multi-thread based on the base library of the host project.

It should be noted that the number of threads used for compilation is less than or equal to the number of the plug-ins to be packaged. When the number of threads used for compilation is equal to the number of the plug-ins to be packaged, one thread compiles one plug-in to be packaged; when the number of threads used for compilation is less than the number of the plug-ins to be packaged, presets the priorities for the plug-ins to be packaged, then the plug-in with a higher priority is compiled in advance based on the priorities of the plug-ins to be packaged.

Alternatively, the plug-in compiling unit 23 includes:

A plug-in version determining module configured for determining whether the plug-in to be packaged is the latest version or not. A plug-in information table is pre-configured, which includes a unique identifier of the plug-in, when the plug-in information (such as the plug-in version number or the plug-in description information) is updated, the plug-in information table is updated synchronously. When determining the plug-in to be packaged, the unique identifier of the plug-in to be packaged is compared to the unique identifier of the plug-in in the plug-in information table, and after the plug-in is matched with a same identification of the plug-in, determines whether the plug-in information for the unique identifier of the same plug-in is updated or not, if not updated, then determines the plug-in corresponding to the same plug-in unique identification of the same plug-in is the plug-in with the latest version, otherwise, determines that the plug-in corresponding to the same plug-in unique identification of the same plug-in is not the plug-in with the latest version.

A latest plug-in compiling module configured for compiling plug-ins required to be packaged by multi-thread based on the base library of the host project when the plug-in to be packaged is the plug-in with a latest version.

It should be noted that when plug-in to be packaged is not the plug-in with a latest version, reminders the user to select the plug-in with a latest version, and then compiles selected plug-in with a latest version by multi-thread.

The compiled plug-in storage unit 24 is configured for storing the compiled plug-ins required to be packaged into resources of the host project.

Wherein, the host project here can be understood as a main project, a main application, in the resources of the host project, resources like pictures, strings and so on could be included as well.

The compiled plug-ins required to be packaged is stored into the directory specified by the host project.

Alternatively, in order to make is convenient for user to view, the compiled plug-in to be packaged is compressed and then stored in a directory specified by the host project.

The apk packet generating unit 25 is configured for packaging the executable file and the resource of the host project into an apk packet together.

Alternatively, the plug-in packaging device includes:

An apk packet signing unit configured for signing the apk packet and thereby obtaining a signed apk packet.

Before the apk packet is signed, a confusion operation can be applied to the content of the apk packet, and the confused apk packet can be signed to further improve the security of the apk packet.

In the second embodiment of the present application, since the plug-ins required to be packaged is compiled respectively by multi-thread, it is possible to improve the compilation speed of each plug-in, thereby improving the packaging speed of the entire apk.

It should be understood that the disclosed device could be implemented in other ways. For example, the device described above are merely illustrative, for example, the division of the units is only a logical function division, and other division could be used in the actual implementation, for example, multiple units or components could be combined or integrated into another system, or some features can be ignored, or not performed. In other words, the coupling or direct coupling or communicating connection shown or discussed could be an indirect, or a communicating connection through some interfaces, devices or units, which could be electrical, mechanical, or otherwise.

Embodiment 3

Figure 3:
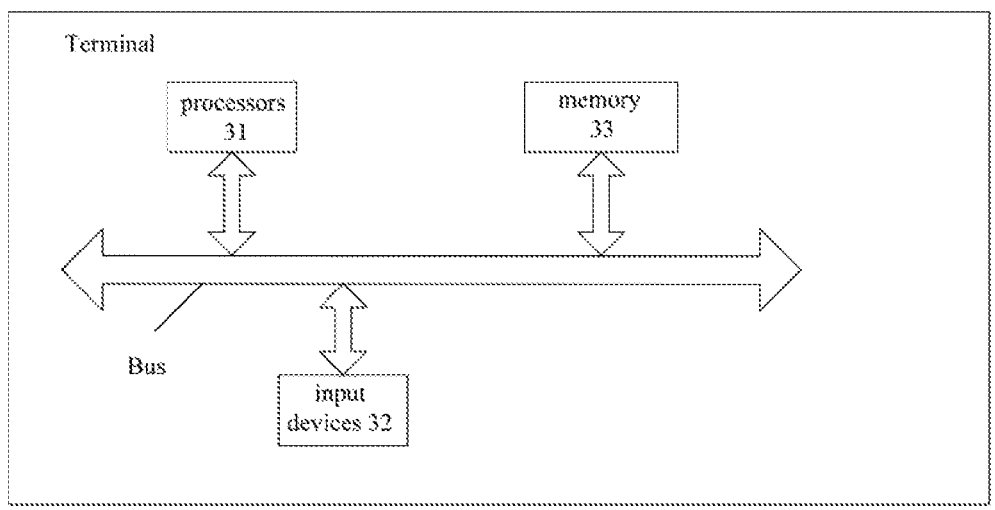
FIG. 3 is a structural diagram of a terminal provided by a third embodiment of the present application.

FIG. 3 is a structural diagram of a terminal provided by a third embodiment of the present application, the terminal could include a user device that communicates with one or more core networks via a wireless access network RAN, the user device could be a mobile phone (or named as a "cellular" phone), a computer having a mobile device, for example, the user device could also be a portable, pocket, handheld, computer built-in or in-vehicle mobile device that exchanges voice and/or data with a wireless access network. As another example, the mobile device could include a smartphone, a tablet, a home theater, a personal digital assistant PDA, a sales terminal POS, or a car computer. For convenience of explanation, only portions related to the embodiments of the present application are shown. It is to be noted that when the terminal is a mobile phone, the mobile phone includes radio frequency (RF) circuit, memory, input unit, display unit, sensor, audio circuit, wireless module, processor, power supply and so on.

The terminal 3 includes one or more processors 31 (only one is shown in the figure), one or more input devices 32 (only one is shown in the figure), and a memory 33. Wherein:

the memory is used to store a plug-in packaging system comprising at least one program instruction which can be executed by a processor;

the processor is used for executing program instructions of the plug-in packaging system to perform following steps:

obtaining an executable file created by compiling a source code of a host project;

obtaining a base library of the host project that includes at least one compiled public base method;

compiling plug-ins required to be packaged respectively by multi-thread based on the base library of the host project;

storing the compiled plug-ins required to be packaged into resources of the host project; and packaging the executable file and the resource of the host project into an apk packet together.

Alternatively, obtaining a base library of the host project that includes at least one compiled public base method includes: obtaining environmental information, version information and compilation tools, the version information including a version number of the host project; obtaining at least one public basic method based on the environmental information and version information; compiling the public basic method according to the compilation tools, to obtain the base library of the host project.

Alternatively, compiling plug-ins required to be packaged respectively by multi-thread based on the base library of the host project includes: determining whether the plug-in to be packaged is the latest version or not; when the plug-in to be packaged is the plug-in with a latest version, compiling plug-ins required to be packaged by multi-thread based on the base library of the host project.

Alternatively, after obtaining at least one public basic method based on the environmental information and version information, the processor is further configured to execute program instructions of the service data processing system to perform the following step:

determining whether the acquired public basic method includes the designated public basic method or not, if not, then prompting to replace the environment information and version information to obtain specified public basic methods through the replaced environment information and version information.

Alternatively, after packaging the executable file and the resource of the host project into an apk packet together, the processor is further configured to execute program instructions of the service data processing system to perform the following step:

signing the apk packet to obtain a signed apk packet.

In the third embodiment of the present application, since the plug-ins required to be packaged is compiled respectively by multi-thread, it is possible to improve the compilation speed of each plug-in, thereby improving the packaging speed of the entire apk.

It should be understood that, in the embodiments of the present application, the processor 31 could be a Central Processing Unit (CPU), a central processing unit, the processor could also be other general processors, Digital Signal Processor (DSP), Application Specific Integrated Circuit (ASIC), Field-Programmable Gate Array (FPGA), or other programmable logic devices, discrete gate or transistor logic device, discrete hardware components and so on. The general processor could be a microprocessor or the processor could also be any conventional processor.

The input device 32 could include a touchpad, a fingerprint pick sensor (for collecting the fingerprint information of the user, and the direction information of the fingerprint), a microphone, a data receiving interface, and so on. The output device could include a display (LCD, etc.), a speaker, a data transmission interface, and the like.

The memory 33 could include read-only memory and random access memory, and provide instructions and data to the processor 31. A portion of the memory 33 could also include a non-volatile random access memory. For example, the memory 33 could also store information of the device type.

Optionally, the terminal 3 further includes a display, the display can be used to display information input by the user or information provided to the user. The display could include a display panel, alternatively, the display panel could be configured in the form of a liquid crystal display (LCD), an organic light-emitting device (OLED), or the like. Further, the display could further include a touch panel, the touch panel could cover a display panel, when the touch panel detects a touch operation on or near it, the a touch operation is sent to the processor 31 to determine the type of touch event, and then the processor 31 provides a corresponding visual output on the display panel according to the type of touch event.

In a particular implementation, the processor 31, the input device 32, the output device, the memory 33, and the display described in the embodiments of the present application could implement the implementation described in the embodiments of the plug-in packaging method provided by the embodiments of the present application, and the implementation described in the terminal described in the second embodiment could be executed as well, and will not be described again.

A fourth aspect of an embodiment of the present application provides a non-transient computer readable storage medium, wherein, the non-transient computer readable storage medium stores instructions executable by one or more processors to perform operations, and the operations include:

obtaining an executable file created by compiling a source code of a host project;

obtaining a base library of the host project that includes at least one compiled public base method;

compiling plug-ins required to be packaged by multi-thread based on the base library of the host project;

storing the compiled plug-ins required to be packaged into resources of the host project;

packaging the executable file and the resource of the host project into an apk packet together.

One skilled in the art will notice that, the elements and algorithm steps of each of the examples described in connection with the embodiments disclosed herein can be implemented in electronic hardware, or in combination with computer software and electronic hardware. These functions are implemented by hardware or software depends on the specific application and design constraints of the technical solution. The skilled people could use different methods to implement the described functions for each particular application, but such implementations should not be considered beyond the scope of the present invention.

The functions can be stored in a computer-readable storage medium if they are implemented in the form of software functional units and sold or used as standalone products. Based on this understanding, the technical solution of the present application essentially or portions contribute to the prior art or portions of the prior art could be embodied in the form of a software product, the computer software product is stored in a storage medium and includes instructions for making a computer device (which could be a personal computer, a server, or a network device, etc.) to perform all or parts of the steps described in the various embodiments of the present application. The above-mentioned storage medium includes a variety of media could store program code, such as a USB disk, a mobile hard disk, a read-only memory (ROM), a random access memory (RAM), a magnetic disk, or an optical disk and so on.

The above description is only specific embodiments of the present application, however the scope of the present application is not limited thereto, it will be readily apparent to those skilled in the art that any changes or substitutions within the scope of the application disclosed are intended to be encompassed within the scope of the present application. Accordingly, the scope of the present application is defined by the scope of the appended claims.

The invention claimed is:

1. A plug-in packaging method, wherein, the method comprises:

obtaining an executable file created by compiling a source code of a host project through an executable file obtaining unit;

obtaining a base library of the host project that comprises at least one compiled public base method through a base library of the host project acquisition unit;

respectively compiling plug-ins required to be packaged by multi-threads based on the base library of the host project through a plug-in compiling unit;

storing the compiled plug-ins required to be packaged into resource of the host project through a compiled plug-in storage unit; and packaging the executable file and the resource of the host project into an apk packet together through an apk packet generation unit, wherein the number of threads is less than or equal to the number of the plug-ins to be packaged, wherein one thread compiles one plug-in to be packaged when the number of threads is equal to the number of the plug-ins to be packaged, otherwise the plug-ins to be packaged are compiled based on the priorities of the plug-ins to be packaged when the number of threads is less than the number of the plug-ins to be packaged.

2. The method according to claim 1, wherein, obtaining the base library of the host project base library of the host project that includes at least one compiled public base method comprises:

obtaining environmental information, version information and compilation tools through an environmental information obtaining module, wherein the version information comprises a version number of the host project;

obtaining at least one public basic method based on the environmental information and version information through a public basic method obtaining module; and compiling the public basic method according to the compilation tools through a base library of the host project generating module to obtain the base library of the host project base library of the host project.

3. The method according to claim 2, wherein, after obtaining at least one public basic method based on the environmental information and version information, the method further comprises:

determining whether the acquired public basic method comprises the designated public basic method or not through a public basic method matching unit, if not, then prompting to replace the environment information and version information to obtain the designated public basic methods through the replaced environment information and version information.

4. The method according to claim 1, wherein, after packaging the executable file and the resource of the host project into an apk packet together, the method further comprises:

signing the apk packet through an apk packet signing unit to obtain a signed apk packet.

5. The method according to claim 1, wherein, compiling plug-ins required to be packaged by multi-threads based on the base library of the host project comprises:

determining whether the plug-in required to be packaged is the latest version or not through a plug-in version determining module; and when the plug-in required to be packaged is in the latest version, respectively compiling plug-ins required to be packaged by multi-thread based on the host project base library through a latest plug-in compiling module.

6. A plug-in packaging device, wherein the device comprises:

an executable file obtaining unit configured for obtaining an executable file created by compiling a source code of a host project;

a base library of the host project acquisition unit configured for obtaining a base library of the host project that includes at least one compiled public base method;

a plug-in compiling unit configured for respectively compiling plug-ins required to be packaged by multi-threads based on the base library of the host project;

a compiled plug-in storage unit configured for storing the compiled plug-ins required to be packaged into resource of the host project; and an apk packet generation unit configured for packaging the executable file and the resource of the host project into an apk packet together, wherein the number of threads is less than or equal to the number of the plug-ins to be packaged, wherein the plug-in compiling unit is further configured such that one thread compiles one plug-in to be packaged when the number of threads is equal to the number of the plug-ins to be packaged, otherwise the plug-ins to be packaged are compiled based on the priorities of the plug-ins to be packaged when the number of threads is less than the number of the plug-ins to be packaged.

7. The device according to claim 6, wherein, the base library of the host project acquisition unit comprises:

an environmental information obtaining module configured to obtain environmental information, version information and compilation tools, wherein the version information comprises a version number of the host project;

a public basic method obtaining module configured to obtain at least one public basic method based on the environmental information and version information; and a base library of the host project generating module configured to compile the public basic method according to the compilation tools to obtain the base library of the host project.

8. The device according to claim 7, wherein, the device further comprises:

a public basic method matching unit configured for determining whether the acquired public basic method comprises the designated public basic method or not, if not, then prompting to replace the environment information and version information to obtain the designated public basic methods through the replaced environment information and version information.

9. The device according to claim 6, wherein, the device further comprises:

an apk packet signing unit, configured for signing the apk packet to obtain a signed apk packet.

10. The device according to claim 6, wherein, the device further comprises:

a plug-in version determining module configured for determining whether the plug-ins required to be packaged is the latest version or not; and a latest plug-in compiling module configured for respectively compiling plug-ins required to be packaged by multi-threads based on the base library of the host project when the plug-in to be packaged is the latest version.

11. A terminal, wherein the terminal comprises a processor and a memory;

the memory is configured to store a plug-in packaging system comprising at least one program instruction which can be executed by a processor;

the processor is configured for executing program instructions of the plug-in packaging system to perform following steps:

obtaining an executable file created by compiling a source code of a host project;

obtaining a base library of the host project that comprises at least one compiled public base method;

respectively compiling plug-ins required to be packaged by multi-thread based on the base library of the host project;

storing the compiled plug-ins required to be packaged into resource of the host project;

packaging the executable file and the resource of the host project into an apk packet together, wherein the number of threads is less than or equal to the number of the plug-ins to be packaged, wherein one thread compiles one plug-in to be packaged when the number of threads is equal to the number of the plug-ins to be packaged, otherwise the plug-ins to be packaged are compiled based on the priorities of the plug-ins to be packaged when the number of threads is less than the number of the plug-ins to be packaged.

12. The terminal according to claim 11, wherein, obtaining a base library of the host project that comprises at least one compiled public base method comprises:
    obtaining environmental information, version information and compilation tools, wherein the version information including a version number of the host project;
    obtaining at least one public basic method based on the environmental information and version information; and
    compiling the public basic method according to the compilation tools, to obtain the base library of the host project.

13. The terminal according to claim 12, wherein, after obtaining at least one public basic method based on the environmental information and version information, the processor is configured to further execute program instructions of the service data processing system to perform the following step:
    determining whether the acquired public basic method comprises the designated public basic method or not, if not, then prompting to replace the environment information and version information to obtain the designated public basic methods through the replaced environment information and version information.

14. The terminal according to claim 11, wherein, after packaging the executable file and the resource of the host project into an apk packet together, the processor is configured to further execute program instructions of the service data processing system to perform the following step:
    signing the apk packet to obtain a signed apk packet.

15. The terminal according to claim 11, wherein, respectively compiling plug-ins required to be packaged by multi-thread based on the base library of the host project comprises:
    determining whether the plug-ins required to be packaged is the latest version or not; and
    respectively compiling the plug-ins required to be packaged by multi-thread based on the base library of the host project, when the plug-ins required to be packaged is the latest version.

16. The method according to claim 2, wherein, after packaging the executable file and the resource of the host project into an apk packet together, the method further comprises:
    signing the apk packet through an apk packet signing unit to obtain a signed apk packet.

17. The method according to claim 2, wherein, compiling plug-ins required to be packaged by multi-threads based on the base library of the host project comprises:
    determining whether the plug-in required to be packaged is the latest version or not through a plug-in version determining module; and
    when the plug-in required to be packaged is in the latest version, respectively compiling plug-ins required to be packaged by multi-thread based on the host project base library through a latest plug-in compiling module.

18. The device according to claim 7, wherein, the device further comprises:
    an apk packet signing unit, configured for signing the apk packet to obtain a signed apk packet.

19. The device according to claim 7, wherein, the device further comprises:
    a plug-in version determining module configured for determining whether the plug-ins required to be packaged is the latest version or not; and
    a latest plug-in compiling module configured for respectively compiling plug-ins required to be packaged by multi-threads based on the base library of the host project when the plug-in to be packaged is the latest version.

* * * * *